2 Sheets—Sheet 1.

S. D. KING.
DUMPING-CARS.

No. 184,389. Patented Nov. 14, 1876.

Witnesses: S. C. Dietrich

Inventor: Sidney D. King
Per C. H. Watson, Attorneys.

THE GRAPHIC CO. N.Y.

2 Sheets—Sheet 2.

S. D. KING.
DUMPING-CARS.

No. 184,389. Patented Nov. 14, 1876.

Witnesses:
P. C. Dieterich
Wm. Brupperman.

Inventor:
Sidney D. King.
Per: C. H. Watson & Co. Attorneys.

THE GRAPHIC CO. N.Y.

UNITED STATES PATENT OFFICE.

SIDNEY D. KING, OF MIDDLETOWN, NEW YORK.

IMPROVEMENT IN DUMPING-CARS.

Specification forming part of Letters Patent No. 184,389, dated November 14, 1876; application filed September 30, 1876.

*To all whom it may concern:*

Be it known that I, SIDNEY D. KING, of Middletown, in the county of Orange and State of New York, have invented certain new and useful Improvements in Dumping-Cars; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a coal and grain car or wagon, as will be hereinafter more fully set forth.

Figure 1:
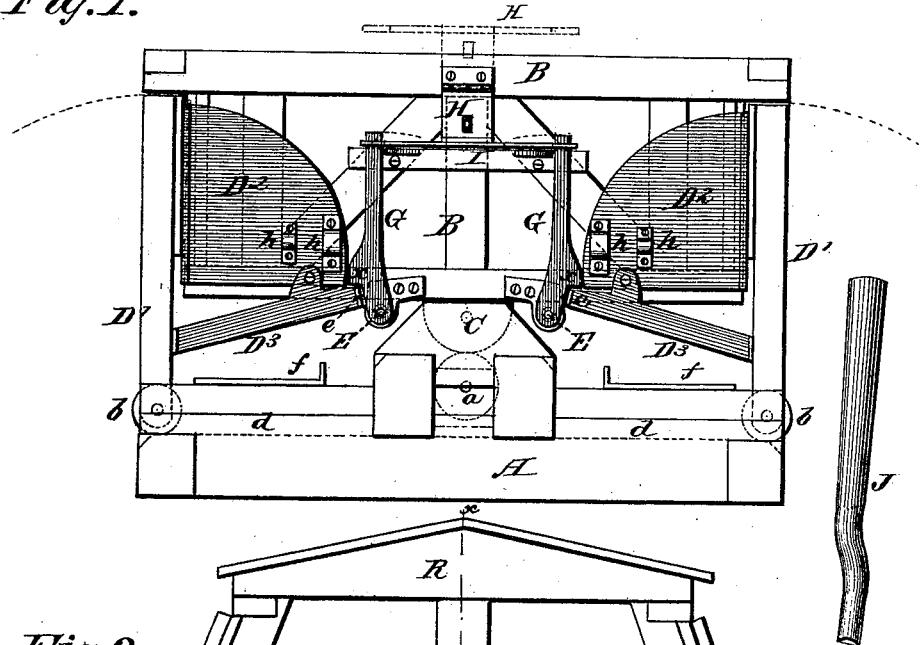
Figure 2:
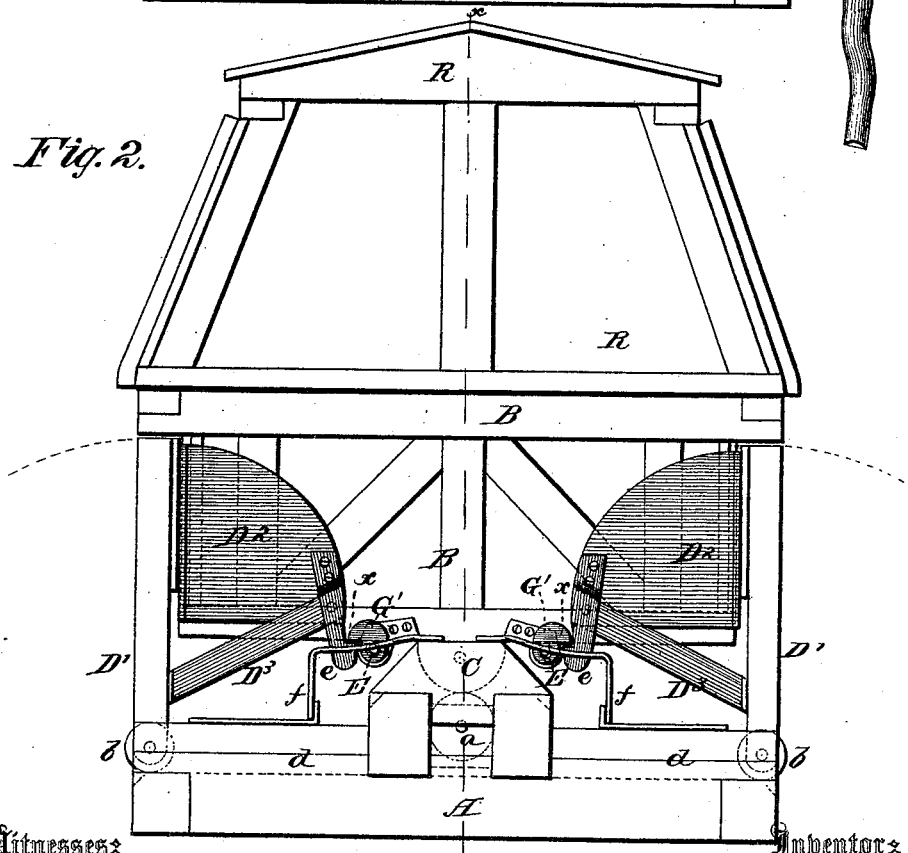
Figure 3:
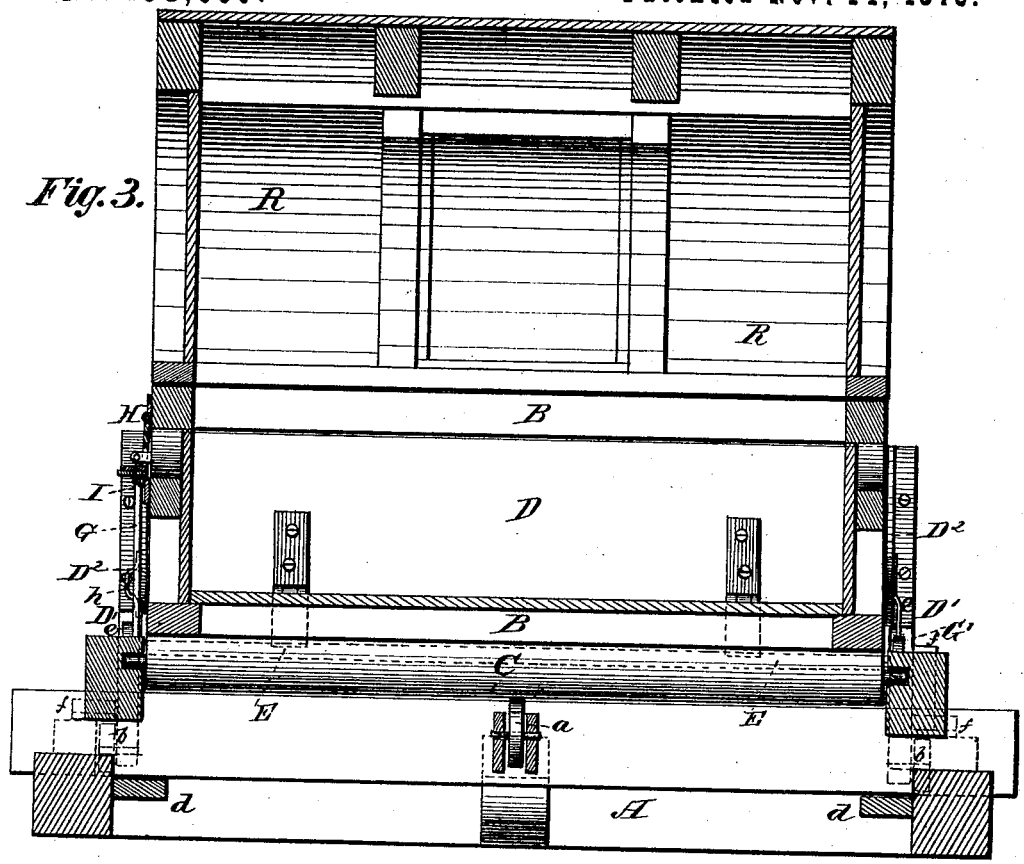
Figure 4:
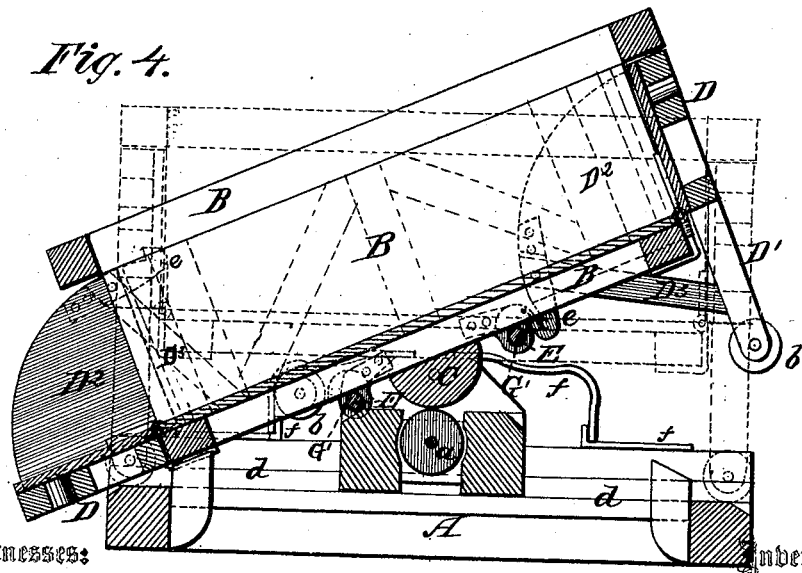

In the annexed drawings, Figure 1 is a side elevation of my invention when used as a coal-car. Fig. 2 is a view of the opposite side when used as a grain-car. Fig. 3 is a longitudinal section of the car; and Fig. 4 is a cross-section of the same, showing it in a tilted position.

A represents the bed-frame of my car or wagon, which frame may be mounted upon wheels to form a wagon or form the bed of a car. B is the box or body, secured to a central roller, C, under its bottom, which roller is journaled in suitable bearings on the frame A, and between said bearings supported upon one or more rollers or wheels, $a$. D D are the end-boards of the box B, which are hinged at their lower edges to the bottom of the box, in such a manner that when either one of them is let down it forms a continuation of the box-bottom. The end-board D is at each end provided with a leg, $D^1$, projecting beyond the side of the box, and provided at its lower end with a wheel or roller, $b$, resting upon a track, $d$, in the main frame A. At each side the end-board D is provided with a segmental plate, $D^2$, to close the space formed when the end-board is let down, said plate being connected with the leg $D^1$, near the lower end thereof, by a brace, $D^3$. Under the bottom of the box A, near each end, in suitable bearings, is placed a shaft, E, having a lever, G, at one end, and at the other end a disk, $G'$. Both the lever G and disk $G'$ are formed with notches or projections $x$ $x$, to catch on hooks or projections $e$ $e$, connected with the side plates $D^2$ or braces $D^3$, when the end-board is closed and the lever G turned so as to catch on a rack, I, secured to the side of the box. When the two levers G $G'$ are thus caught a T-shaped latch, H, hinged to the top of the box, is let down over the upper ends thereof, which latch can then be secured by means of any suitable lock. To the frame A, above the track $d$ at each end, is secured an upper track, $f$, as shown.

When the latch H has been raised either lever G can be moved inward, whereby the hooks $x$ on the lever and disk are removed from the hooks or projections $e$, corresponding therewith. This end-board D can then be turned down by means of a lever, J, inserted in staples $h$ $h$ on one of the side plates $D^2$. As this end-board thus turns, the rollers $b$, attached to its legs $D^1$, rise up to the under side of the upper tracks $f$ at that end, whereby the whole box is at once tilted sufficiently to bring the load, or a major portion thereof, over the center. The load then completes the tilting of the box, throwing the end-board entirely down, and dumping the entire contents of the box. The end-board is raised again by means of the lever J bringing the box back into a horizontal position, when the end-board is locked as before.

When the box is to be used for grain it is provided with a suitable roof, R, as represented in Fig. 2.

Having thus fully described my invention, what I claim as new, and desire to secure by Letters Patent, is—

1. In a dumping car or wagon, the box B, secured to a center roller, C, journaled in bearings on a bed-frame, and the box supported in a horizontal position by means of legs $D^1$, attached to the hinged end pieces D, and provided with wheels or rollers $b$, all substantially as and for the purposes herein set forth.

2. The upper tracks $f$, arranged on the bed-frame A for the wheels $b$ to operate against for the purpose of tilting the box B, as herein set forth.

3. The combination of the hinged end piece

D, legs D¹, plates D², braces D³, and projections $e$, with the shaft E, having lever G and disk G', provided with hooks $x$ $x$, substantially as and for the purposes herein set forth.

4. The combination of the levers G G, rack I, and T-shaped latch H, as and for the purposes herein set forth.

In testimony that I claim the foregoing as my own I affix my signature in presence of two witnesses.

SIDNEY D. KING.

Witnesses:
H. RELYEA,
HENRY W. WIGGINS.